US007574376B1

(12) United States Patent
Berman et al.

(10) Patent No.: US 7,574,376 B1
(45) Date of Patent: Aug. 11, 2009

(54) SYSTEM AND METHOD FOR GENERATING AND USING A TRANSACTION ENABLE REPORT

(75) Inventors: Terry Berman, Clifton, VA (US); Illa Baskine, Bethesda, MD (US); Hu Yu, Falls Church, VA (US); Vladlslav Lazebnikov, Rockville, MD (US)

(73) Assignee: Microstrategy Incorporated, McLean, VA (US)

( * ) Notice: Subject to any disclaimer, the term of this patent is extended or adjusted under 35 U.S.C. 154(b) by 560 days.

(21) Appl. No.: 09/878,371

(22) Filed: Jun. 12, 2001

(51) Int. Cl.
*G06Q 30/00* (2006.01)
(52) U.S. Cl. .......................... 705/26; 705/27
(58) Field of Classification Search .............. 705/26–27
See application file for complete search history.

(56) References Cited

U.S. PATENT DOCUMENTS

| | | | |
|---|---|---|---|
| 4,688,195 A | 8/1987 | Thompson | |
| 4,829,423 A | 5/1989 | Tennant | |
| 5,197,005 A | 3/1993 | Shwartz | |
| 5,276,870 A | 1/1994 | Shan | |
| 5,418,943 A | 5/1995 | Borgida | |
| 5,421,008 A | 5/1995 | Banning | |
| 5,555,403 A | 9/1996 | Cambot | |
| 5,584,024 A | 12/1996 | Shwartz | |
| 5,664,182 A | 9/1997 | Nirenberg | |
| 5,692,181 A | 11/1997 | Anand | |
| 5,732,398 A * | 3/1998 | Tagawa | 705/5 |
| 5,864,818 A * | 1/1999 | Feldman | 705/5 |
| 5,864,856 A | 1/1999 | Young | |
| 5,914,878 A | 6/1999 | Yamamoto | |
| 6,154,766 A | 11/2000 | Yost | |
| 6,236,991 B1 * | 5/2001 | Frauenhofer et al. | 707/6 |
| 6,247,008 B1 | 6/2001 | Cambot | |
| 6,279,033 B1 | 8/2001 | Selvarajan | |
| 6,535,855 B1 * | 3/2003 | Cahill et al. | 705/1 |

OTHER PUBLICATIONS

MS: "MicroStrategy Telecaster Delivers E-Business Intelligence to Customers Directly Via the Telephone," PR Newswire, Sep. 13, 1999, 4pgs, Proquest #44634292.*
MS: "MicroStrategy Enhances DSS Server to Support E-Business Initiatives with Improved Performance, Reliability, and Scalability," Business Wire, Jun. 8, 1999, 3pgs, Proquest #42220526.*
MS1: "Microstrategy launches Microstrategy 6m . . . ," PR Newswire, Apr. 24, 2000, Dialog file 20 #10706187, 3pgs.*
MS1: Whiting, Rick; "Microstrategy helps E-Commerce go mobile . . . ," Information Week, Apr. 24, 2006, Dialog file 275 #02395399, 2pgs.*

(Continued)

*Primary Examiner*—Robert M. Pond
(74) *Attorney, Agent, or Firm*—Hunton & Williams LLP (57) ABSTRACT

A system and method for a enabling transactions based on provided informational and transactional data. Data distribution servers provide e-mail and other messages of topical interest to a subset of the subscribers. The content may be generated by an OLAP based channel database system, and the output may also be communicated to individuals via spreadsheet programs data, pager, telephone, mobile phone, fax, personal digital assistants, HTML e-mail and other formats, including a workbook file attachment. Reports generated may enable a subscriber to perform one or more transactions is response to the content, thereby permitting interaction with the report.

20 Claims, 8 Drawing Sheets

OTHER PUBLICATIONS

MS2: "NCR and MicroStrategy link technologies and products to give businesses a two-way connection to today's active consumers," PR Newswire, Apr. 7, 2000, Dialog file 148 #11940011, 3 pgs.*

Robert C. Stern, Bruce M. Anderson and Craig W. Thompson, A Menu-Based Natural Language Interface To A Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saez, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saez, Building Usable Menu-Based Natural Language Interfaces To Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

* cited by examiner

SYSTEM AND METHOD FOR GENERATING AND USING A TRANSACTION ENABLE REPORT

FIELD OF THE INVENTION

This invention relates to enabling a transaction from provided informational and transactional content from a system, such as an OLAP-based system, where the informational and transaction content may be provided to individuals through use of an output delivery system to email, web page, pager, mobile phone, fax, telephone, personal digital assistants and other terminal devices.

BACKGROUND OF THE INVENTION

Decision support systems have been developed to efficiently retrieve selected information from data warehouses. One type of decision support system is known as an on-line analytical processing system. In general, OLAP systems analyze the data from a number of different perspectives and support complex analyses against large input data sets.

Reports may be generated by obtaining information and providing the report to a user. A report may be provided in a client-server relationship, over a network access (e.g., posted on a web-site), or delivered directly to the subscriber. Current report systems, however, involve one-way communication, and provide no opportunity for a user to respond or interact within the report.

These and other drawbacks exist.

SUMMARY OF INVENTION

The invention relates to a system and method for enabling a transaction for a subscriber (also referred to a user) to respond to informational and transactional content provided to the subscriber, such as via a web posting, e-mail, voice and other channels. Content may include informational, message or other forms of content, and may be in the form of a report.

According to an embodiment of the invention, content is aggregated from multiple data sources and services, such as databases, web pages, ERP Systems, OFX drivers and other sources. The aggregated content may be presented on a single page or report in an open source manner to a subscriber. The report may be "transaction enabled," where a user can select from various transactions to perform in response to the report.

A subscriber's response, or lack of response, may then be gathered, such as to analyze the use of the content. Upon acting on information, the subscriber's actions, or inactions, are aggregated, along with other subscriber's actions and inactions and other gathered information. Using data mining techniques, the user's actions may be analyzed, along with the actions of other users. Analysis may include analyzing a particular subscriber's actions based on a particular report, the subscriber's actions based on a plurality of reports, all subscribers' actions based on a particular report(s) and other permutations.

As an example of the present system, a Finance channel may be provided that has information about Investments. Upon receiving the data, a subscriber may perform one or more actions, including deleting the message containing the data, forwarding the data to another person, or directing a purchase. In the financial setting, up learning that a particular stock has reach a certain value, the subscriber may direct a broker to buy or sell the stock. The subscriber's actions may be gathered and stored, thereby allowing analysis of the actions that occurred to determine the effectiveness of output.

Other objects and advantages exist for the present invention.

DETAILED DESCRIPTION OF THE PRESENT INVENTION

According to an embodiment of the invention, customizable personal data services such as financial, news or other topical sources are provided to subscribers such as by delivery via data distribution servers. With the system of the present invention, a person may define what information he would like delivered, when he would like to have it delivered, where to deliver the information and how often to deliver the information. This system provides a user with the information required to make completely informed decisions faster, easier and cheaper.

According to an embodiment of the invention, a user may be provided a report with requested information that is transaction enabled, where the user may act on information provided in the report. Providing a report may include delivery of a report, the report to a web-site for later access, or other manners of providing access to the contents of the report. A report, generated by one user, may contain "hooks" (e.g., links, embedded messages, etc.) to a transaction engine to enable the receiving user to act on the information contained within the report.

Further, the receiving user's responses may be obtained and analyzed. According to an embodiment of the invention, the receiving user's responses may be analyzed to generate feedback regarding the usefulness of the content delivered. Feedback may enable future content provided to the receiving user to be more narrowly tailored to the receiving user's needs.

Figure 1:
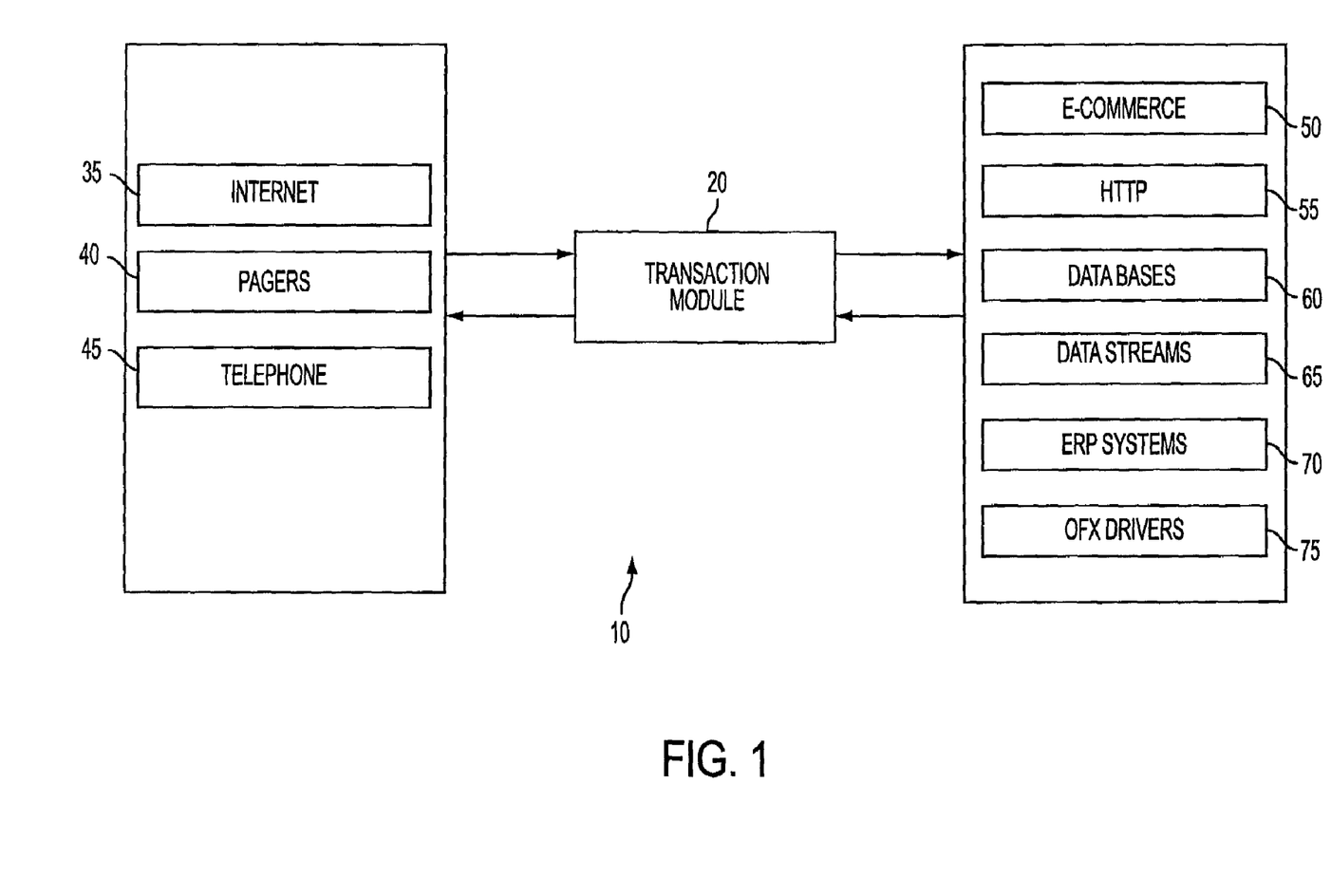
FIG. 1 depicts a transaction flow in an integrated data aggregation and transaction process according to an embodiment of the invention.

The present invention enables subscribers to complete transactions via XML compliant databases, including WAP phones, PDAs, pagers, web browsers and telephones. According to the embodiment illustrated in FIG. 1, a transaction system 10 may comprise a transaction module for providing universal transactional capabilities between a variety of subscriber devices and information systems. As illustrated in FIG. 1, subscriber devices may include WAP devices 25 such as digital telephones, PDA device 30, internet device 35, pager device 40 or telephone device 45. Subscriber devices may be any conventional device either known or to be invented which enables a subscriber to communicate, preferably, over a network. Transaction module 20 provides an interface through which a subscriber gains access to a variety of information systems, including e-commerce systems 50, HDTP systems 55, databases 60, datastream 65, ERP system 70 and OFX driver 75. Transaction module 20 may connect with other information systems as well, such as, commerce systems, business intelligence systems, legacy systems, and other information sources.

According to an embodiment of the invention, transaction module 20 may aggregate the information from the plurality of information systems to provide a seamless delivery of the desired information to the subscriber in an appropriate format. According to an embodiment of the invention, a report provided may enable a user to act on the contents of the report. By way of example, financial information from a financial database, such as a financial database which stores new product announcements, as well as information from a datastream, such as, a stock market datastream which provides up-to-date information regarding the current level of the NASDAQ stock index may be compiled within transaction module 20. A subscriber may request a service that alerts the subscriber when any member of the NASDAQ average issues a press release. Further, the subscriber may request that the NASDAQ average, as well as the NASDAQ members stock price be provided to the subscriber in a voice communication. When the appropriate parameters have been met, transaction module 20 obtains the requested information and translates it into the requested format, in this case, into a voice communication. The voice communication is then distributed to a WAP device 25 or telephone 45 as directed by the subscriber. Other manners for aggregating information may also be used.

Continuing with this example, the report detailing the NASDAQ average and stock price for each of the NASDAQ member stocks may enable the user to act on the information. The report may include options for the user to act. By way of this example, the user may forward the information to another, may send a buy or sell order to a stock broker or may perform another transaction.

According to another embodiment of the invention, a system is provided to act as a gateway between network users and a target transaction processing system. The transaction system may maintain knowledge of transaction data formats within the target transaction processing system, as well as the specific transaction steps which are required to execute operations on the target system. The transaction system may act as a mediator for transactions between the subscriber and the target transaction processing system and provide tools to integrate existing transaction processing systems with the transaction gateway functions.

Figure 2:
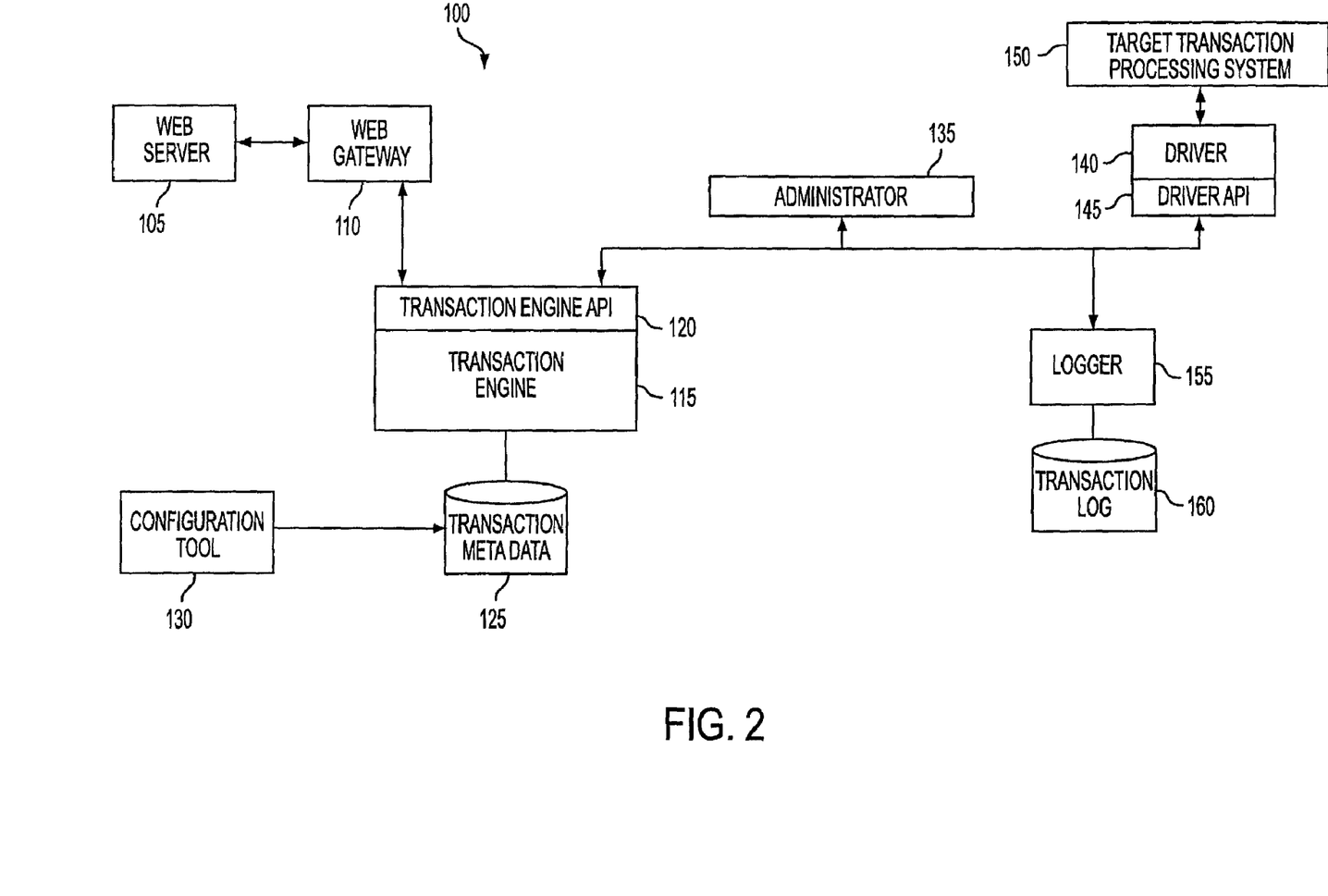
FIG. 2 depicts a schematic architecture for transaction processing according to an embodiment of the invention.

FIG. 2 illustrates a transaction system 100 for mediating the transactions between the subscriber and the target transaction processing system. Transaction engine 115 is responsible for accepting incoming transaction data (i.e., data from each transaction step) and for providing that data to the target transaction processing system. According to an embodiment of the invention, transaction data provided to transaction engine 115 may consist of XML formatted messages. Transaction engine 115 performs any translation or mapping required to convert the input XML message to an acceptable output message. By way of example, it may be desirable to translate the XML formatted message into an HTTP format. Other method for translation may also be used. Output messages may be in any format that can be converted by XSL processing, including HTML, WML and XML. Transaction engine 115 generates the output messages and sends it to driver module 140 to perform the required options on the target transaction processing system 150. Similarly, transaction engine 115 may generate messages for a subscriber. Subscriber messages are sent to web gateway 110 and forwarded to web server 105 for display to the subscriber.

For each transaction type, transaction engine 115 may maintain information stored as metadata in transaction metadata module 125. Metadata may describe the characteristics of each transaction, where the characteristics may define the individual transaction steps, the output transformation and other data relevant to the transaction.

During the processing of a transaction, transaction engine 115 may maintain the state of the transaction and perform many actions defined in the metadata description. Using this approach, it may be possible to accommodate transactions which can be executed against a wide variety of systems with varied purposes. By way of example only, during the course of a single transaction, it may be possible to send and receive a response from an external transaction processing system, execute an analysis report and retrieve the results, and then provide a response back to the subscriber. It may also be possible, by using this approach, to enter a transaction on an external system and then execute a second transaction on another system as part of a single transaction sequence. This capability would allow an execution of an order followed by a recording of the transaction within an invoicing system. Other manners of processing transactions may also be used.

Logger device 155 may store a log of a transaction activity in transaction log database 160. The information logged may vary depending upon the desire of a system administrator as well as internal and external regulations required with a process (e.g., Federal and state, banking requirements for financial transactions, etc.)

Transaction engine 115 may comprise a transaction engine API 120 which may facilitate the use of the transaction engine 115 with other programs outside of the transaction system 100. According to an embodiment of the invention, multiple transaction engines 115 may be employed to provide both scalability and flexibility. By way of example, multiple transaction engines 115 may be used where each engine is capable of performing the same sort of transactions, thereby providing a robust system due to redundancy. By way of another example, multiple transaction engines 115 may be set up such that each engine will handle a different set of transactions, thereby providing a transaction system 100 with increased processing speeds. Other configurations may also be used.

Transaction system 100 may be monitored and/or controlled by providing an administrator component 135. The administrator 135 may provide a user interface such that various transaction engines 115 in driver modules 140 may be monitored and controlled, such as by an administrator. Monitoring functions may include the ability to monitor the ongoing transaction activity, observe various statistics (e.g., transaction execution timing remote system availability, etc.) and other information pertinent to the transaction system 100. Control functions may include the ability to start and stop operations and transactions and to abort transactions which are executed.

A configuration tool module 130 may be provided to create, modify and generate configuration data and transaction metadata stored in transaction metadata storage device 125. Configuration tool 130 may provide a subscriber with a graphical interface that depicts the transaction flow and allows the subscriber to build and modify the steps for each transaction.

According to an embodiment of the invention, to facilitate the processing of a transaction on an external system. A variety of components for driver module 140 may be used. A function of the driver module 140 is to translate the incoming XML formatted data and to perform actions specified by that data on the target system. By way of example, the incoming XML data may specify customer, item to be purchased and a credit card number. Driver module 140 extracts the data elements from the XML string and then format commands that are specific to the target system to execute the transaction. Driver module 140 may provide a response back to the requesting transaction engine 115. Driver module 140 may comprise a driver API 145. Driver API 145 may be available so that third party vendors or customers may build their own driver implementations.

To provide the flexibility for an interface with a wide variety of target transactions systems, a variety of driver modules 140 may be provided as well as the ability to build new driver modules 140. Standard driver modules may be created to accommodate processing on well-known commerce engines (e.g., ERP System, Legacy system, Microsoft Site server, etc.). Other driver modules 140 may be provided such that an interface can be effected directly into the transaction systems database. To accommodate situations where customization may be required, a tool kit for constructing driver modules 140 may be made available to users.

Logger module 155 may provide for the recording of transaction data. Logger module 155 may accept XML formatted messages from transaction engine 115 and map these messages such that they can be recorded in transactional log database 160. Logger module 155 may maintain a user interface to provide for the definition of the logged messages as well as the mapping or transformations required. The user interface may also allow a user to perform basic administrative functions, such as creating and deleting logs, or quickly reviewing the contents of the data stored in the logs. Various levels of logging may be provided. Levels may be informational, warning, severity and other levels. Further, according to an embodiment of the invention, logs may be in a database or may be text, depending upon the needs of a particular system.

Various factors may drive the architectural design of transaction system 100. According to an embodiment of the invention, transaction system 100 may be used primarily to implement large scale e-business web sites, thereby offering scalability such that the performance preferences of such web sites can be satisfied. To address the scalability issue, the transaction system 100 may rely upon an underlying architecture that provides for the use of multiple servers as well as multiple driver modules 140, thereby allowing the transaction system 100 to scale in accordance with the system demands. Further, such an architecture may also provide the opportunity for high reliability solutions.

According to an embodiment of the invention, the transaction system 100 may permit integration with a wide variety of transaction systems and, therefore, provide a convenient mechanism to effect this integration. The transaction system 100's specific interaction with the driver module 140 may be isolated, thereby providing flexibility in building interfaces to external systems. Where an interface is made to a well-defined entity such as a commercially available commerce engine (e.g., ERP/Legacy system), then driver module 140 may be generalized and offered as products. In the example where the driver module 140 is system-specific, a tool kit may be made available for a user or users to build the interface.

According to an embodiment of the invention, the transaction system 100 may maintain platform independence so that the transaction system 100 may execute on a broad range of e-business systems. By way of example, the transaction system 100 may be implemented in JAVA which is now widely supported on both Microsoft and UNIX platforms, as well as on IBM proprietary operating systems. Other implementations may also be used.

Figure 3:
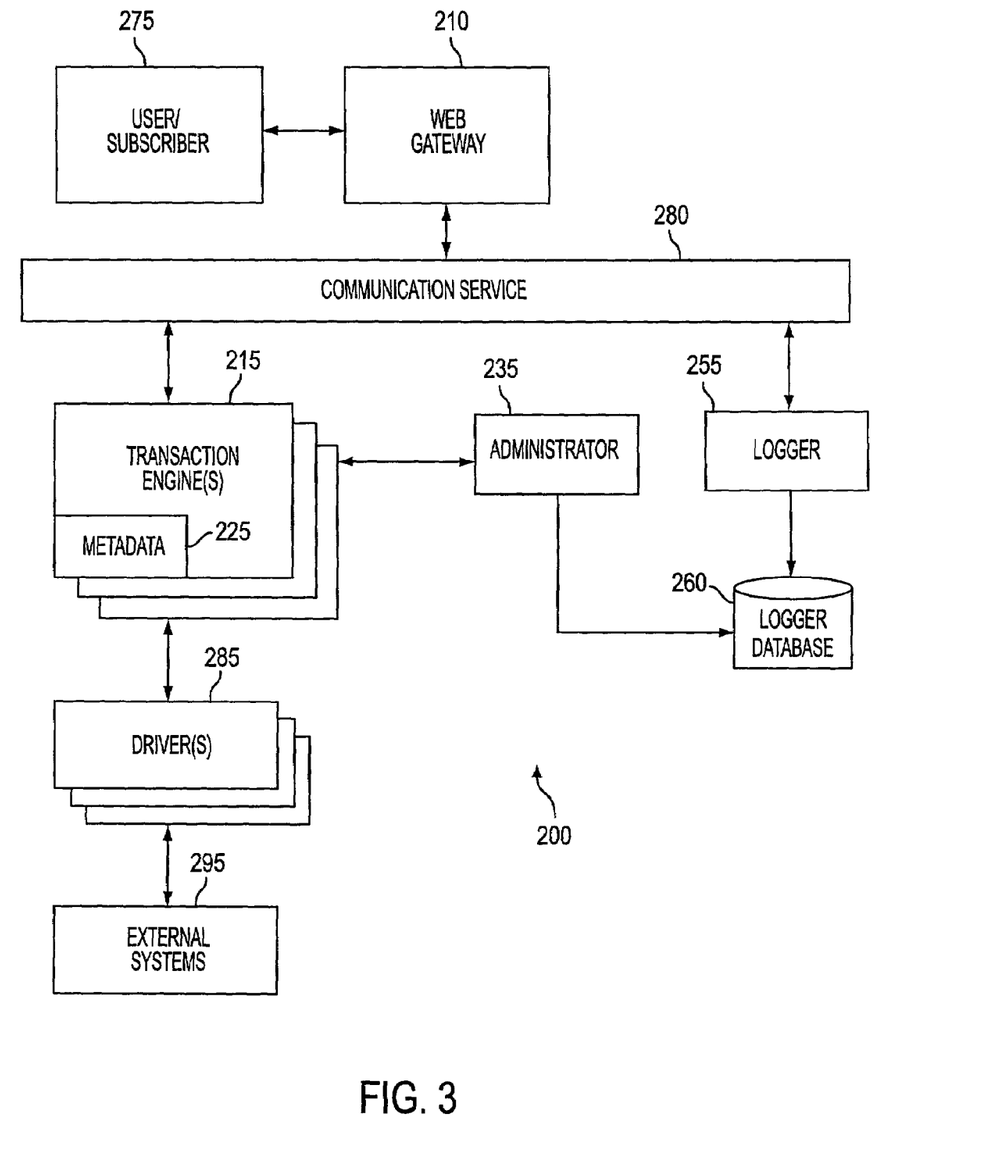
FIG. 3 depicts another schematic architecture for transaction processing according to an embodiment of the invention.

FIG. 3 is a schematic representation of a transaction system 200 for mediating transactions between the subscriber and the transaction processing system according to another embodiment of the invention. FIG. 3 contains many elements which are similar to those found in system 100 of FIG. 2 and which may perform similar functions. Transaction engine 215 may be responsible for accepting incoming transaction data (i.e., data from each transaction step) and for providing that data to the target transaction processing system. According to an embodiment of the invention, transaction data provided to transaction engine 215 may consist of XML formatted messages, but other formats, such as HTML and WML may also be used. Transaction engine 215 performs any translation or mapping to convert the input XML message to an acceptable output message. By way of example, it may be necessary to translate the XML formatted message into an HTTP format. Other methods of translations may also be used. Output messages may be in any format that can be converted by XSL processing, including HTML, WML and XML. Transaction engine 215 generates the output messages and sends it to driver module(s) 285 to perform the options on external systems 295. Similarly, transaction engine 215 may generate messages for a subscriber 275 (also referred to as a user). Subscriber messages are sent to web gateway 210 through communications service 280 and forwarded to the subscriber 275.

For each transaction type, transaction engine 215 maintains information stored as metadata in transaction metadata module 225 of transaction engine 215. Metadata may describe the characteristics of each transaction, where the characteristics may define the individual transaction steps, the output transformation and other data relevant to the transaction.

During the processing of a transaction, transaction engine 215 may maintain the state of the transaction and perform many actions defined in the metadata description. Using this approach, it may be possible to accommodate transactions which can be executed against a wide variety of systems with varied purposes. By way of example only, during the course of a single transaction, it may be possible to send and receive a response from an external transaction processing system, execute an analysis report and retrieve the results, and then provide a response back to the subscriber. It may also be possible, by using this approach, to enter a transaction on an external system and then execute a second transaction on another system as part of a single transaction sequence. This capability would allow an execution of an order followed by a recording of the transaction within an invoicing system. Other manners of processing transactions may also be used.

Logger device 255 may store a log of a transaction activity in logger database 260. The information logged may vary depending upon the desire of a system administrator as well as internal and external regulations required with a process (e.g., Federal and state, banking requirements for financial transactions, etc.). According to an embodiment of the invention, logger 255 may receive information regarding transaction activity from java space 280, and store the information in logger database 260. Other configurations may also be used.

According to an embodiment of the invention, multiple transaction engines 115 may be employed to provide both scalability and flexibility. By way of example, multiple transaction engines 115 may be used where each engine is capable of performing the same sort of transactions, thereby providing a robust system due to redundancy. Other configurations may also be used.

Transaction system 200 may be monitored and/or controlled by providing an administrator component 235. The administrator 235 may provide a user interface such that various transaction engines 215 may be monitored and controlled, such as by an administrator. Monitoring functions may include the ability to monitor the ongoing transaction activity, observe various statistics (e.g., transaction execution timing remote system availability, etc.) and other information pertinent to the transaction system 200. Control functions may include the ability to start and stop operations and transactions and to abort transactions which are executed. Administrator 235 may further access logger database 260 to facilitate monitoring and control of transaction system 200. Other configurations may also be used.

According to an embodiment of the invention, to facilitate the processing of a transaction on an external system, a variety of components for driver module 285 may be used. A function of the driver module 285 is to translate the incoming XML formatted data and to perform actions specified by that data on the target system. By way of example, the incoming XML data may specify customer, item to be purchased and a credit card number. Driver module 285 extracts the data elements from the XML string and then format commands that are specific to the target system to execute the transaction. Driver module 285 may provide a response back to the requesting transaction engine 215.

A library may provide a set of callable routines for Administrator 235, which may be available during the course of traction processing. According to an embodiment of the invention, a callable routine may be a security routine and may provide security for information transfers. Security features may include the ability to protect selected data fields through the use of encryption. According to an embodiment of the invention, Administrator 235 may direct the administration of security devices, such as encryption. Further, decryption of incoming transfers may also be available.

To provide the flexibility for an interface with a wide variety of target transactions systems, a variety of driver modules 285 may be provided as well as the ability to build new driver modules 285. Standard driver modules may be created to accommodate processing on well-known commerce engines (e.g., ERP System, Legacy system, Microsoft Site server, etc.). Other driver modules 285 may be provided such that an interface can be effected directly into the transaction systems database. To accommodate situations where customization may be required, a tool kit for constructing driver modules 285 may be made available to users.

Logger module 255 may provide for the recording of transaction data. Logger module 255 may accept XML formatted messages from transaction engine 215 and map these messages such that they can be recorded in logger database 260. Logger module 255 may maintain a user interface to provide for the definition of the logged messages as well as the mapping or transformations. The user interface may also allow a user to perform basic administrative functions, such as creating and deleting logs, or quickly reviewing the contents of the data stored in the logs. Various levels of logging may be provided. Levels may be informational, warning, severity and other levels. Further, according to an embodiment of the invention, logs may be in a database or may be text, depending upon the needs of a particular system.

Various factors may drive the architectural design of transaction system 200. According to an embodiment of the invention, transaction system 200 may be used to implement feedback regarding use of information, reports, messages and other transactions sent to a user. According to a further embodiment of the invention, transaction system 200 may be used to implement transaction enabled large scale e-business web sites, thereby offering scalability such that the performance requirements of such web sites can be satisfied. To address the scalability issue, the transaction system 200 may rely upon an underlying architecture that provides for the use of multiple servers as well as multiple driver modules 240, thereby allowing the transaction system 200 to scale in accordance with the system demands. Further, such architecture may also provide the opportunity for high reliability solutions.

According to an embodiment of the invention, the transaction system 200 may permit integration with a wide variety of transaction systems and, therefore, may provide a convenient mechanism to effect this integration. The transaction system 200's specific interaction with the driver module 240 may be isolated, thereby providing flexibility in building interfaces to external systems. Where an interface is made to a well-defined entity such as a commercially available commerce engine (e.g., ERP/Legacy system), then driver module 240 may be generalized and offered as products. Where the driver module 240 may be system-specific, a tool kit may be made available for a user or users to build the interface.

According to an embodiment of the invention, the transaction system 200 may maintain platform independence so that the transaction system 200 may execute on a broad range of e-business systems. By way of example, the transaction system 200 may be implemented using any middleware or communication services, as demonstrated by communication service 280. According to an embodiment of the invention, java may be used. A middleware or communication services which is supported on Microsoft and UNIX platforms, as well as on IBM proprietary operating systems may be. Other implementations may also be used.

As previously described, information received by a subscriber, such as a report, may be transaction enabled, such that the subscriber may perform a transaction in response to information contained or derived from the report. According to an embodiment of the invention, a report may be generated using the system and method set forth in FIGS. 11 and 12. By way of one example, a report regarding a stores inventory may be generated. For a particular item, such as "widgets," the number of widgets in stock, as well as the number of widgets sold over various time frames (e.g., the last week, the last two weeks, the last month, etc.) may be provided.

The subscriber receives the report and decides to purchase more widgets based on the current inventory and the expected sales for the next month. Within the report is an embedded link to a transaction system, such as the transaction systems described in FIGS. 2 and 3. The subscriber activates the embedded link, and the information is transmitted to the transaction system to purchase the widgets.

According to an embodiment of the invention, the interaction with the transaction system may vary from a minimal amount to maximum interaction. In one embodiment, a subscriber may activate the embedded link to transmit information to a transaction system without providing any additional information. The information transmitted may come directly from the report, and direct the transaction system to purchase the appropriate number of widgets from a particular source. In another embodiment, upon activating the embedded link, the subscriber may provide instructions to the transaction system regarding how many widgets to purchase and the supplier from whom to purchase the widgets. Other permutations may also be used. According to an embodiment of the invention, the creator of the report may designate how the report receiver interacts with the transaction engine.

According to an embodiment of the invention, a creator may begin with a web report, such as that generated by MicroStrategy's Web. The web report may be converted into another format, such as a text format and a developer's kit may be used to add transaction information. According to another embodiment of the invention, a receiving subscriber may receive an e-mail message containing embedded links for extracting information from the e-mail contents (e.g., from the report) and providing the information to a transaction system (e.g. via e-mail or the World Wide Web). Other methods for transaction enabling a report may also be used.

Figure 4:
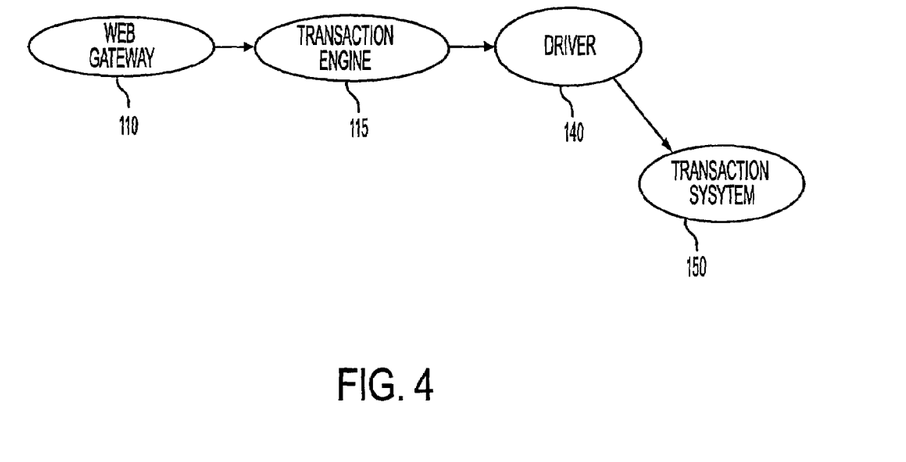
FIG. 4 depicts a transaction flow according to an embodiment of the invention.

FIG. 4 illustrates a diagram of a simple transaction flow through transaction system 100. Information from web gateway 110 is transferred to transaction engine 115 and processed. The processed information is then forwarded to driver module 140 and further forwarded to transaction system 150.

Figure 5:
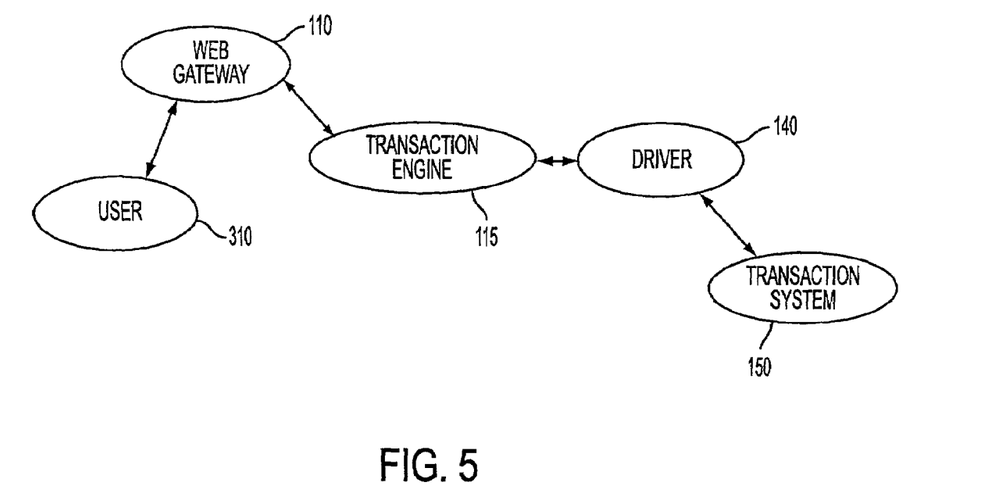
FIG. 5 depicts information flow of an interactive transaction process according to an embodiment of the invention.

FIG. 5 illustrates an example of a user interacting with transaction system 100 according to an embodiment of the invention. User 310 interacts with web gateway 110 to initiate the transaction. User 310 interacts with web gateway 110, providing the information and instructions to perform the transaction. Based on the information and instructions received from user 310, web gateway 110 forwards the information to transaction engine module 115, where the information is processed based, at least in part, upon the instructions of the users and the desired destination for the information. Transaction engine module 115 forwards the processed information to driver module 140, which in turns forwards the information to target transaction processing system 150. The information is processed and the results of the processing are returned through driver module 140 to transaction module 115. The received results are then processed according to the needs of the user 310 and forwarded to web gateway 110. User 310 may then access the information from web gateway 110. Other manners for conducting transactions through transaction system 100 may also be used.

The transaction system 100 may maintain the user context (e.g., all of the data input by the user, all of the data generated during the transaction steps, etc.) Thus, making the data available to serve on any communication back to the user during the course of processing. Transaction system 100 may also maintain knowledge of the user session enabling transaction based timeouts to be established for the user and all other transactions and progress to be aborted when such a transaction-based timeout is encountered.

Transaction system 100 may also dynamically combine information received from external systems and combine it further with communications, such as web pages to be served back to the user. This combination of information and presentation back to a user may be provided in the transaction system 100 without use of scripting, thereby providing for ease of integration and seamless building of e-business contents.

The transaction system 100 may also provide for flexible error processing and control. Since the transaction engine module 115 can process the information returned during each step and make decisions based on this data, the transaction module 115 may also provide improvements over what can be done relative to conventional web page scripting facilities, thereby improving system reliability.

According to an embodiment of the invention, to provide flexibility, all transaction data may be represented internally in XML format. Further, the control information which describes the transaction steps may also comprise XML formatted data. While XML becomes the standard format whereby transactions can be represented, other formats may also be used depending on the needs of the users and subscribers. Use of the XML format may enable the transaction system 100 to be compliant with existing and emerging meta-language standards for transaction processing and drives the operation of each component to be generic.

As described above, transaction system 100 may support the ability to configure multiple transaction engine modules 115 to distribute the overall transaction load. A client process (e.g., web gateway 110) initiating transactions may be isolated from the mechanism used to perform the load distribution. That is, the client process need not be aware of the particular transaction engine that is performing the transaction steps.

According to an embodiment of the invention, transaction engine module 115 may support the execution and control of related transactions. Each transaction may serve a particular function in the execution of an overall sequence and can be related to, or depend upon, other transactions within the sequence as appropriate. A transaction controller may execute a transaction sequence in accordance with pre-established definition that may include the inter-relationship between the transactions within the sequence. The actual description of the transaction sequence, and all associated information, may be contained in the transaction metadata storage 125. As has been described above, a transaction may be a set of work to be performed on behalf of a user or a subscriber. A transaction step may be a single action within a transaction. Within transaction engine 115, this may entail sending a message to a destination and receiving a response. A transaction sequence may be a collection of related transaction steps that constitute a transaction.

A transaction sequence may also include a set of transactions that in turn execute an action external to transaction system 100. According to an embodiment of the invention, input data and output data of each transaction may be defined as XML formatted messages. When a transaction begins execution, it receives an input message from the transaction controller. This input message may originate either externally (i.e., external to transaction engine module 115) or may be generated as a result of a previous transaction execution. If a transaction sequence consists of more than one transaction, then those transactions typically are related. The relationship between transactions may be defined within the transaction metadata.

Figure 6:
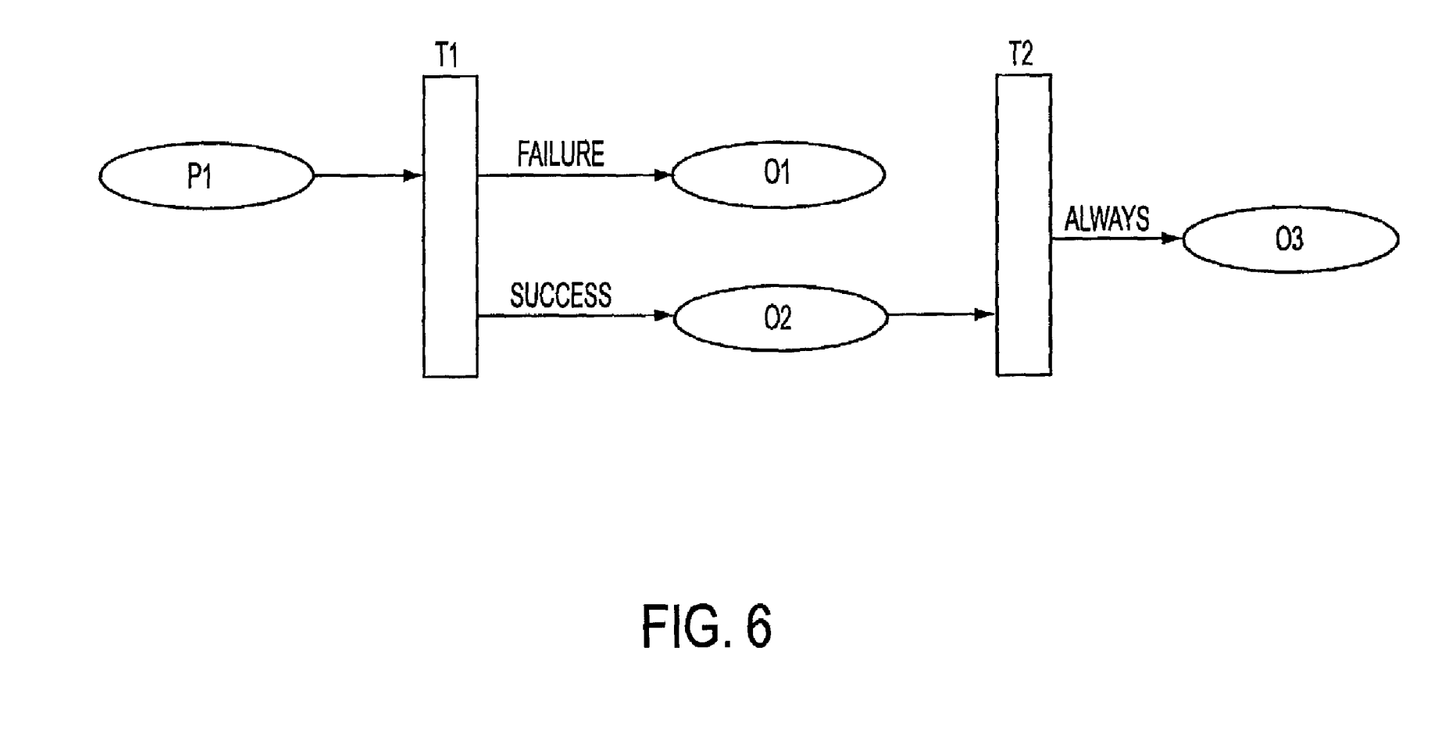
FIG. 6 depicts customer centric information flow according to an embodiment of the invention.

FIG. 6 illustrates an example of a transaction sequence involving two transactions. The diagram depicts a network that contains two types of nodes. The first type of node is known as a place node and represents transaction input and output. Place nodes are represented as circles in FIG. 6. The second type of node is known as a transition node and represents the execution of a transaction. Transition nodes are represented as rectangles in FIG. 6.

For any transaction sequence, there will be a set of nodes that represent the initial nodes and a set of nodes that represent the final nodes. In the example of FIG. 6, P1 represents an initial node and O1 and O3 represent final nodes. After a transaction executes, it produces a formatted string that can be interpreted. According to an embodiment of the invention, this may comprise an XML formatted string. By way of example, a value within the string may indicate whether the transaction has succeeded or failed. In the example of FIG. 6, this is represented by the place nodes O1 and O2 that extend from transaction node T1. In this case, place node O1 could be entered if the transaction failed and place O2 would entered if the transaction succeeded.

If place node O2 is entered, then the data output from transaction node T1 may be provided to transaction node T2 and the transaction associated with transaction node T2 may be executed. Should a transformation of the data be required, then this may be done prior to executing the transaction associated with transaction node T2. Once transaction node T2 completes execution, then place O3 is entered. As indicated in the diagram, place node O3 will be entered regardless of the data produced by transaction node T2. Other configurations for transactions including more complex transactions involving a plurality of place nodes and a plurality of transaction nodes may also be used.

According to another embodiment of the invention, transaction system 100 may enable access to certain web pages within a web site, such as information pages, transaction pages, or the like. While reference is made to transaction system 100 in FIG. 1, it is understood that transaction system 200 in FIG. 2 may also be used in the embodiments described below Access to such pages may be provided within a subscriber service, such as an information service where a subscriber receives news and information regarding certain products. By way of example only, a subscriber selects a service which provides information about mountain bikes. When the appropriate conditions have been met, the subscriber receives a communication, such as an e-mail message, including information about mountain bikes, such as a press release from Cannon describing their newly released mountain bike. Further, the e-mail message may include the ability to access, such as through a hypertext link, a transaction web page within a web site operated by Cannon, where the subscriber can use the transaction web page to purchase the newly released mountain bike. According to an embodiment of the invention, the communication may provide a deep link to a page within a web site.

Further, information related to the desired product and/or service may be obtained from the web page to which the deep link accesses. Transaction engine module 115 may access information from the web page, and convert the information into a desired format for presentation to the subscriber. According to an embodiment of the invention, transaction engine module 115 may perform a "screen scraping" process, where the contents of one or more screens within a web site may be obtained by extracting the data or information from the screens, such as screens on a third party web site. Transaction engine module 115 may convert the extract data into a various formats for processing and presentation of the data and information for a subscriber. By way of one example, transaction engine module 115 may extract the initial data, convert the extracted data into a format to facilitate processing. After processing, transaction engine module 115 may then convert the processed data into a format for presentation of the data to a subscriber. Other manners for converting may also be used.

According to an embodiment of the invention, screen scraping may be performed by making a copy of the page or pages desired. By way of example, transaction engine module 115 may make a copy of an HTML page or an XML page and then extract the information therein on a real-time basis. The extracted information may then be presented to a subscriber, thereby providing the most update information available for the desired page. By way of another example, copies of an HTML page or an XML page may be made at a predetermined time, such as immediately before the initial communication is sent to the subscriber. The extracted information may then be presented to the subscriber, thereby providing desired information without waiting for extraction and processing. Other manners for extracting information may also be used.

Use of screen scraping techniques may occur based on the authorization of a subscriber. When selecting a service, a subscriber may authorize an administrator to access relevant information. Based upon the subscriber authorization, transaction system 100 may access one or more web sites and extract information from web pages within the web sites. According to an embodiment of the invention, transaction system 100, in acting on behalf of a subscriber, may assume a network identity of the subscriber, thereby accessing a web site under the subscribers identity. To the web site and its administrators, it appears that the subscriber is directly accessing the web site, when the transaction system 100 is actually accessing the web site on behalf of the subscriber. The manner in which transaction system 100 may depend upon international, federal, state, and/or local laws, rules and regulations, as well as rules and regulations a web site may have. By way of example, federal law may prohibit accessing a web site under an assumed identity, but allow a third party to extract information from a web site on behalf of another. In this example, transaction system 100 would extract the information on behalf of the subscriber, but would do so under its own identity with authorization from the subscriber. Other manners of extracting information may also be used.

In extracting data, transaction system 100 may copy all or portions of the page or pages desired. Using the copied portions, transaction system 100 may extract the desired data. Transaction system 100 may perform temporal or transitory copying to extract the data or information. Copying may include copying software or source code to extract the information or data. The transaction system 100 extracts the desired information (e.g., price, model, shipping information, warranty, service plans, etc.) from the copied portion. The copied portion may include software, source code, images, photographs, text, music or other portions of a web page or web site. Extracted data and information may then be transformed. Transformation of data and information may include discarding unnecessary information, retaining desired information, reformatting information in to a desired format, processing information, or other manners of transformation.

According to an embodiment of the invention, transaction system 100 may determine what portions of a web page require entry of information, and what information is required for the entry. By way of example, transaction system 100 may copy a purchase web page in an XML format. The purchase web page contains transaction system 100 extracts the information, determined what information is required (e.g., quantity order, delivery address, payment option, credit card number, etc.), and provides known information as directed by a subscriber.

Information may be provided as directed, where a subscriber may direct that only required information is provided, all information but a social security number is provided, or other permutations. According to another embodiment of the invention, a subscriber may direct that certain features are activated or deactivated within a web page, such as deactivate a module for providing subscriber information to others (e.g., opting out a of mailing list), and activating a designation to receive info on updates. Such features may permit easy use of transaction screens/pages by enable purchases and/or requests for information to be performed in a shorter amount of time. Further, such features may be transparent to web site and administrator, such that the transaction appears to web site that the subscriber is providing the information.

According to another embodiment of the invention, voice completion of transactions may also be provided, where a subscriber provides the information via voice communication. Information regarding a transaction may be obtained by scraping a web page, using a personal shopper, or other methods. The gathered information is reformatted to present in voice communication to the subscriber.

The subscriber provides responsive information by voice (e.g., an instruction to purchase an item), which is converted into the proper format. Information is placed into the proper entry field, based on any applicable prompts, thereby automatically filling in the appropriate entry fields. This feature may permit easy use of transaction and information request pages by enabling purchases and/or requests via voice communication, and may provide compatibility and compliance under the Americans with Disabilities Act. Other features and advantages may also be present.

According to an embodiment of the invention, electronic customer relationship marketing may be performed by gathering and analyzing past customer behavior. An ECRM business process may involve designing an interaction based on relevant information, personalizing the interaction for the customer, providing the customer with the information at an at appropriate place and time and facilitating the interaction and closing any ensuring transactions.

Analyzing behavior may be facilitated by gathering information regarding a subscriber's actions, or inactions, with received information. As informational and transaction content is presented, the subscriber may select any number of options to respond to the information, including deleting the information, forwarding it to another, performing a transaction within the system based on the information, doing nothing, or other options. Feedback regarding a subscriber's actions may also include transactions performed, web sites and web pages accessed, and information requested by the subscriber. In addition, a subscriber's inactions may be obtained as well. By way of example, information may be gathered if a subscriber has not acted upon a report within a predetermined time frame (e.g., one week). By way of another example, information may be gathered regarding when a subscriber acts upon information. Thus, it may be determined through the gathered information and analysis that one subscriber does not typically respond to a report until three days after a report is delivered, while another subscriber typically responds to a report within six hours of receiving it. Other permutations may also be used. According to an embodiment of the invention, content may contain an indication, such as a "cookie" or other manner of tracking receipt of the information. Information about a subscriber's actions is then gathered, and may be stored in a database or other storage device. Data about the subscriber's actions can then analyzed, using data-mining techniques, such as those found in the MicroStrategy 7 platform. Such analysis may allow for more targeted delivery of information (e.g., ensuring that only those subscriber's interested in particular information receive it), and more relevant information and services for a subscriber.

Figure 7:
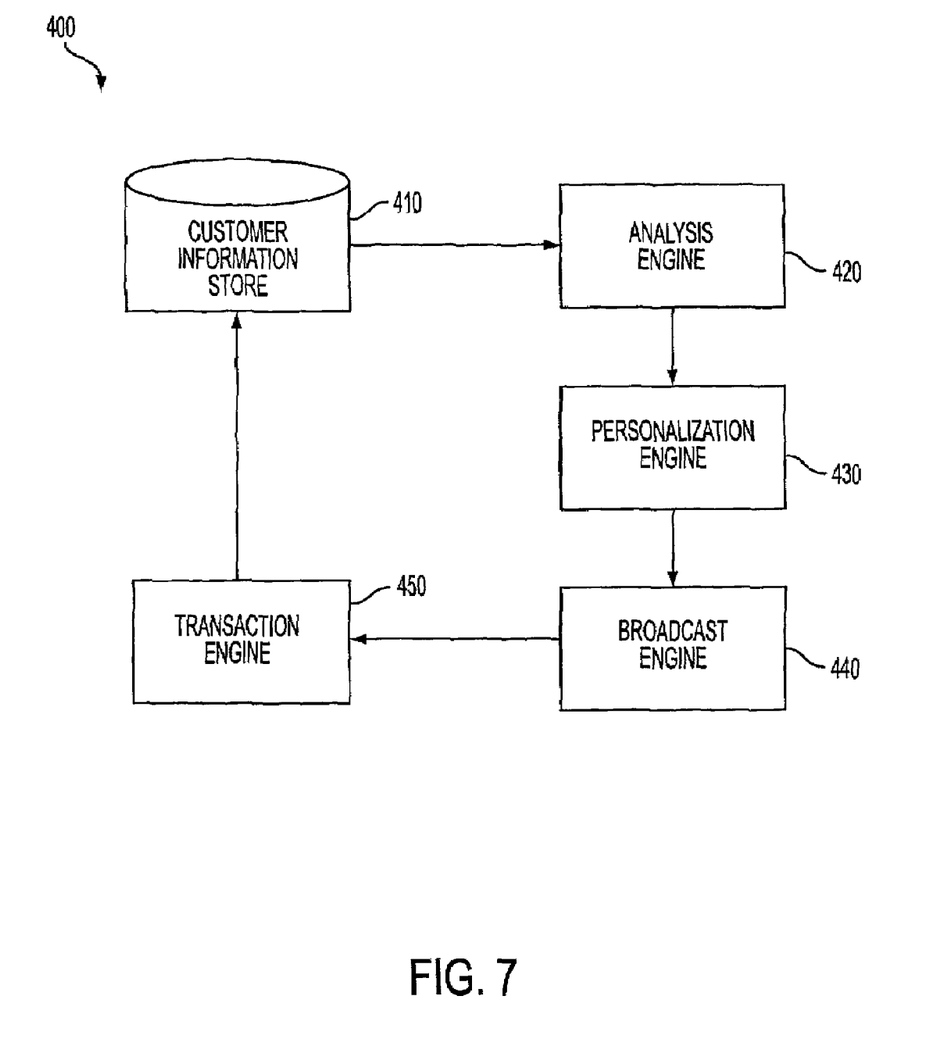
FIG. 7 depicts a schematic representation of a system for accessing a network according an embodiment of the invention.

FIG. 7 illustrates an ECRM system 400 according to an embodiment of the invention. Customer information store module 410 may consolidate information about one or more customers together with preferences, permissions and information that may be useful to the customer. Information from customer information store module 410 is accessed by analysis engine module 420. Analysis module 420 may analyze customer information to create a business campaign strategy and evaluate its success. Results of analysis engine module 420 are forwarded to personalization module 430 where the results are personalized to a particular customer by configuring unique sets of messages and offers to each customer.

Broadcast engine module 440 communicates the selected information and offers to the appropriate customers. Based on subscriber preferences, the communication may be transmitted in the media of the subscriber's choice (e.g., e-mail, voice message, etc.). Transaction engine module 450 facilitates the interactions between the customer and the ECRM system 400. Facilitating the interactions may include exchanging information or driving transactions. Additionally, transaction engine module 450 may compile information based on the customer's response to a communication and forward this information to customer information store module 410 thereby enhancing and adding to the information already gathered.

According to an embodiment of the invention, ECRM system 400 may be a robust scaleable and flexible platform which enables custom-made software to be seamlessly integrated to provide marketing to large numbers of customers. Scalability may enable a user of ECRM system 400 to more easily increase the size of the system to accommodate the information obtained from the customer. Multiple data models and database architectures may be accommodated and allow for integration with other back-end information systems. This flexibility may enable growth in the information obtained from the customers.

ECRM system 400 may enable speed and accuracy of access to customer centric information for enabling a value exchange with customers. The ability to aggregate information at different levels of abstraction (e.g., transaction, customer, zip code, etc.) may enable a user to discern patterns of customer behavior (e.g., sizes of clothing sold by zip code).

Analysis and segmentation techniques of gathered information may include on-line analytical processing (OLAP), data mining and statistics. OLAP tools may perform complex queries on a database. Data mining tools may analyze gathered information to discover unforeseen associations using pattern matching algorithms. Statistical tools may perform complex mathematical operations on the gathered information. According to another embodiment of the invention, collaborative OLAP (relational OLAP) may combine features of statistical analysis techniques and data mining analysis techniques to iterate answers to analytical questions.

By way of example, a customer may visit a bricks and mortar store and register at a kiosk. Later, at home, the customer receives a "thank you for visiting" e-mail along with a specific special offer. Interested, the customer clicks on a hyperlink to an on-line store associated with the bricks and mortar store. At the on-line store, the customer received advice from a virtual shopping assistant and designs her own wardrobe. A few days later, the customer is alerted by an amicably generated phone call that a preferred sweater style has become available. The customer makes a purchase by pressing keys on the phone key pad and picks up the package from the store that evening.

In the above example, the customer information store module 140 provides an integrated view of both on-line and off-line interactions between the company and the customer. Additionally, analysis engine module 420 may assist in determining the type of sweater the customer is likely to purchase. Personalization engine module 430 provides the customized wardrobe and shopping experience for the customer. Broadcast engine 440 may communicate a message to the customer and present her with a unique transaction offer. Transaction engine module 450 may facilitate the flow of information between the customer and the company and close the ensuing transaction. Further, transaction engine module 450 may gather information from the transaction and forward it to customer information store module 410, thereby providing seamless integrated feedback.

Figure 8:
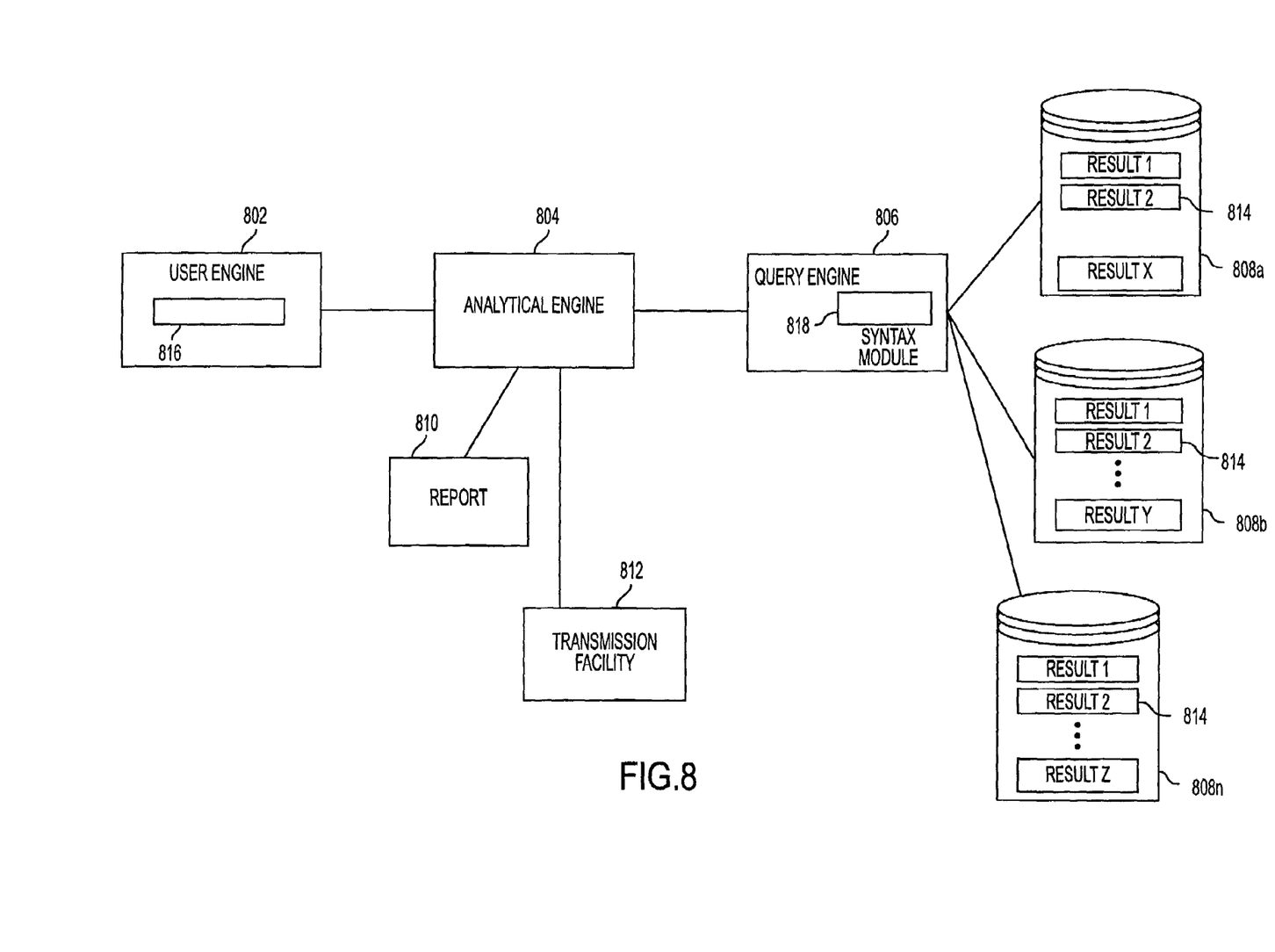
FIG. 8 depicts a network architecture for accessing data sources to generate a report according to an embodiment of the invention.

FIG. 8 is a block diagram illustrating a system 800 by which a variety of data resources may be accessed for business analytic, report generation and other intelligence purposes according to an embodiment of the invention. A system, such as MicroStrategy 7 may be used for generating reports, such as transaction enabled reports that permit a user to interact with a transaction system, such as transaction system 100 of FIG. 1 and/or transaction system 200 of FIG. 2. According to a preferred embodiment, the system 100 may comprise an Online Analytical Processing (OLAP) decision support system (DSS). In general, through using the system 100 of the invention, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods of the invention. This is in part because the size and complexity of some data portfolios stored in such databases or database arrays may mask those trends.

As illustrated in FIG. 8, a business, a government or another user may access the resources of the system 800 using a user engine 802. The user engine 802 may include a query input module 116 to accept a plurality of searches, queries or other requests, via a query box on a graphical user interface (GUI) or another similar interface. The user engine 802 may communicate with an analytical engine 804. The analytical engine 804 may include a set of extensible modules to run a plurality of statistical analyses, to apply filtering criteria, to perform a neural net technique or another technique to condition and treat data extracted from data resources hosted in the system 800, according to a query received from the user engine 802.

The analytical engine 804 may communicate with a query engine 806, which in turn interfaces to one or more data storage devices 808a, 808b . . . 808n (where n is an arbitrary number). The data storage devices 808a, 808b . . . 808n may include or interface to a relational database or another structured database stored on a hard disk, an optical disk, a solid state device or another similar storage media. When implemented as databases, the data storage devices 808a, 808b . . . 808n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 808a, 808b . . . 808n are illustrated as a plurality of data storage devices, in some embodiments the data storage devices may be contained within a single database or another single resource.

Any of the user engine 802, the analytical engine 804 and the query engine 806 or other resources of the system 800 may include or interface to or be supported by computing resources, such as one or more associated servers. When a server is employed for support, the server may include, for instance, a workstation running a Microsoft Windows™ NT™ operating system, a Windows™ 2000 operating system, a Unix operating system, a Linux operating system, a Xenix operating system, an IBM AIX™ operating system, a Hewlett-Packard UX™ operating system, a Novell Netware™ operating system, a Sun Microsystems Solaris™ operating system, an OS/2™ operating system, a BeOS™ operating system, a MacIntosh operating system, an Apache operating system, an OpenStep™ operating system, or another similar operating system or platform.

The data storage devices 808a, 808b . . . 808n may be supported by a server or another resource and may, in some embodiments, include redundancy, such as a redundant array of independent disks (RAID), for data protection. The storage capacity of any one or more of the data storage devices 808a, 808b . . . 808n may be of various sizes, from relatively small data sets to very large database (VLDB)-scale data sets, such as warehouses holding terabytes of data or more. The fields and types of data stored within the data storage devices 808a, 808b . . . 808n may also be diverse, and may include, for instance, financial, personal, news, marketing, technical, addressing, governmental, military, medical or other categories of data or information.

The query engine 806 may mediate one or more queries or information requests from those received from the user at the user engine 802 to parse, filter, format and otherwise process such queries to be submitted against the data contained in the data storage devices 808a, 808b . . . 808n. Thus, a user at the user engine 802 may submit a query requesting information in SQL format, or have the query translated to SQL format. The submitted query is then transmitted via the analytical engine 804 to the query engine 806. The query engine 806 may determine, for instance, whether the transmitted query may be processed by one or more resources of the data storage devices 808a, 808b . . . 808n in its original format. If so, the query engine 806 may directly transmit the query to one or more of the resources of the data storage devices 808a, 808b . . . 808n for processing.

If the transmitted query cannot be processed in its original format, the query engine 806 may perform a translation of the query from an original syntax to a syntax compatible with one or more of the data storage devices 808a, 808b . . . 808n by invoking a syntax module 818 to conform the syntax of the query to standard SQL, DB2, Informix™, Sybase™ formats or to other data structures, syntax or logic. The query engine 806 may likewise parse the transmitted query to determine whether it includes any invalid formatting or to trap other errors included in the transmitted query, such as a request for sales data for a future year or other similar types of errors. Upon detecting an invalid or an unsupported query, the query engine 806 may pass an error message back to the user engine 802 to await further user input.

When a valid query such as a search request is received and conformed to a proper format, the query engine 806 may pass the query to one or more of the data storage devices 808a, 808n . . . 808n for processing. In some embodiments, the query may be processed for one or more hits against one or more databases in the data storage devices 808a, 808b . . . 808n. For example, a manager of a restaurant chain, a retail vendor or another similar user may submit a query to view gross sales made by the restaurant chain or retail vendor in the State of New York for the year 1999. The data storage devices 808a, 808b . . . 808n may be searched for one or more fields corresponding to the query to generate a set of results 814.

Although illustrated in connection with each data storage device 808 in FIG. 8, the results 814 may be generated from querying any one or more of the databases of the data storage devices 808a, 808b . . . 808n, depending on which of the data resources produce hits from processing the search query. In some embodiments of the system 800 of the invention, the results 814 may be maintained on one or more of the data storage devices 808a, 808b . . . 808n to permit one or more refinements, iterated queries, joinders or other operations to be performed on the data included in the results 814 before passing the information included in the results 814 back to the analytical engine 804 and other elements of the system 800.

When any such refinements or other operations are concluded, the results 814 may be transmitted to the analytical engine 804 via the query engine 806. The analytical engine 804 may then perform statistical, logical or other operations on the results 814 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 804 may process such queries to generate a quantitative report 810, which may include a table or other output indicating the results 814 extracted from the data storage devices 808a, 808b . . . 808n. The report 810 may be presented to the user via the user engine 802, and, in some embodiments, may be temporarily or permanently stored on the user engine 802, a client machine or elsewhere, or printed or otherwise output. In some embodiments of the system 800 of the invention, the report 810 or other output may be transmitted to a transmission facility 812, for transmission to a set of personnel via an email, an instant message, a text-to-voice message, a video or via another channel or medium. The transmission facility 812 may include or interface to, for example, a personalized broadcast platform or service such as the Narrowcaster™ platform or Telecaster™ service sold by MicroStrategy Incorporated or another similar communications channel or medium. Similarly, in some embodiments of the invention, more than one user engine 802 or other client resource may permit multiple users to view the report 810, such as, for instance, via a corporate intranet or over the Internet using a Web browser. Various authorization and access protocols may be employed for security purposes to vary the access permitted users to such report 810 in such embodiments.

Figure 9:
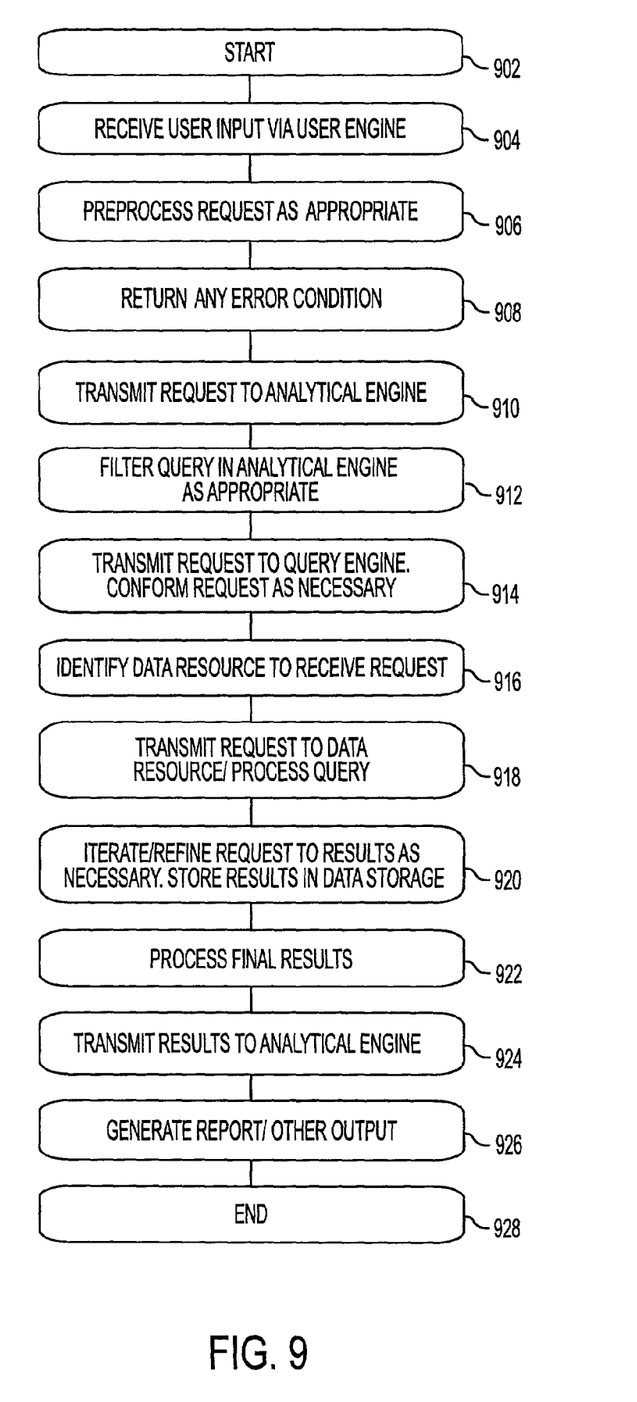
FIG. 9 depicts a flow chart of query engine processing according to an embodiment of the invention.

The steps performed in a method 900 for processing data according to the invention are illustrated in the flowchart of FIG. 9. In step 902, the method 900 begins. In step 904, the user may supply input, such as a query or a request for information, via the user engine 902. In step 906, the user input query may be preliminarily processed, for instance, to determine whether it includes valid fields and for other formatting and error-flagging issues. In step 908, any error conditions may be trapped and an error message presented to the user, for correction of the error conditions. In step 910, if a query is in a valid format, the query may then be transmitted to the analytical engine 804.

In step 912, the analytical engine 804 may further process the input query as appropriate to ensure the intended results 814 may be generated to apply the desired analytics. In step 914, the query engine 806 may further filter, format and otherwise process the input query to ensure that the query is in a syntax compatible with the syntax of the data storage devices 808a, 808b . . . 808n. In step 916, one or more appropriate databases or other resources within the data storage devices 808a, 808b . . . 808n may be identified to be accessed for the given query.

In step 918, the query may be transmitted to the data storage devices 808a, 808b . . . 808n and the query may be processed for hits or other results 814 against the content of the data storage devices 808a, 808b . . . 808n. In step 920, the results 814 of the query may be refined, and intermediate or other corresponding results 814 may be stored in the data storage devices 808a, 808b . . . 808n. In step 922, the final results 814 of the processing of the query against the data storage devices 808a, 808b . . . 808n may be transmitted to the analytical engine 804 via the query engine 806. In step 924, a plurality of analytical measures, filters, thresholds, statistical or other treatments may be run on the results 814. In step 926, a report 810 may be generated. The report 810, or other output of the analytic or other processing steps, may be presented to the user via the user engine 802. In step 928, the method 900 ends.

Other embodiments and uses of the invention will be apparent to those skilled in the art from consideration of the specification and practice of the invention disclosed herein. The specification and examples should be considered exemplary only.

What is claimed is:

1. A process for providing a transaction enabled decision support system report to a subscriber, where the subscriber is able to perform a transaction based at least in part on information contained within the report, the process comprising the steps of:
   aggregating, via a transaction module, content from multiple data sources and services;
   selecting, via the transaction module, at least one element of information from the aggregated content;
   generating, via an analytical engine, a report, wherein the report contains the at least one element of information and at least one activatable option for performing at least one transaction relative to the at least one element of information;
   providing, via broadcast engine module, the report to the subscriber over a network;
   receiving, via a transaction engine, an activation of the at least one activatable option for performing the at least one transaction, wherein the at least one transaction involves an exchange of value; and
   facilitating, via a driver module, the performance of the transaction.

2. The process according to claim 1, wherein the at least one transaction comprises forwarding at least a portion of the at least one element of information to a third party.

3. The process according to claim 1, wherein the at least one transaction comprises purchasing an item based on the at least one element of information, and wherein the received activation includes an instruction to purchase the item.

4. The process according to claim 3, where the step of facilitating the at least one transaction further comprises:
   a) identifying a third party associated with selling the item;
   b) forwarding the received instruction to the third party;
   c) receiving an indication from the third party regarding the purchase of the item; and
   d) forwarding the received indication to the subscriber.

5. The process according to claim 1, wherein the step of generating a report further comprises:
   a) accessing information from at least one information source;
   b) selecting at least a portion of the accessed information;
   c) determining a format for the report; and
   d) selecting at least one link for enabling the subscriber to perform the at least one transaction based on the selected at least one element of information within the report.

6. The process according to claim 1, wherein the step of providing the report comprises transmitting the report to the subscriber.

7. The process according to claim 1, wherein the step of facilitating a transaction comprises a step of generating a second report.

8. The process according to claim 1, further comprising the step of presenting the report again to the subscriber after facilitating the transaction.

9. A system for providing a transaction enabled decision support system report to a subscriber, where the subscriber is able to perform a transaction based at least in part on information contained within the report, the system comprising:
content gathering means for gathering content from multiple data sources and services;
report generation means for generating a report, wherein the report comprises at least one element of information selected from the gathered content in the report;
transaction enabling means for transaction enabling the at least one element of information in the report through associating at least one activatable option for performing at least one transaction relative to the at least one element of information;
report providing means for providing the report to the subscriber over a network;
option selection receiving means for receiving selection of the at least one activatable option for performing the at least one transaction, wherein the at least one transaction involves an exchange of value; and
transaction facilitation means for facilitating the performance of the transaction.

10. The system of claim 9, wherein the at least one transaction comprises forwarding at least a portion of the at least one element of information to a third party.

11. The system of claim 9, wherein the at least one transaction comprises purchasing an item based on the at least one element of information, and wherein the received activation includes an instruction to purchase the item.

12. The system of claim 11, wherein the transaction facilitating means identifies a third party associated with selling the item, forwards the received instruction to the third party, receives an indication from the third party regarding the purchase of the item, and forwards the received indication to the subscriber.

13. The system of claim 9, wherein the report generation means accesses information from at least one information source; and
wherein the transaction enabling means enables selection of at least a portion of the accessed information and provision of at least one link for enabling the subscriber to perform the at least one transaction based on the selected at least one element of information within the report.

14. The system of claim 9, wherein the transaction facilitation means initiates an execution of a second report that is then transmitted to the subscriber.

15. The system of claim 9 wherein the report provision means provides the report again to the subscriber after facilitating the at least one transaction.

16. A medium storing code for causing a processor to enable a system user to transaction enable a decision support system report to be sent a subscriber, where the subscriber is able to perform a transaction based at least in part on information contained within the report, the medium comprising:
code for causing a processor to aggregate content from multiple data sources and services;
code for causing a processor to select at least one element of information from the aggregated content;
code for causing a processor to generate a report, wherein the report contains the at least one element of information and at least one activatable option for performing at least one transaction relative to the at least one element of information;
code for causing a processor to provide the report to the subscriber over a network;
code for causing a processor to receive an activation of the at least one activatable option for performing the at least one transaction, wherein the at least one transaction involves an exchange of value; and
code for causing a processor to facilitate the performance of the at least one transaction.

17. The medium of claim 16, further comprising code for causing a processor to:
a) identify a third party associated with selling an item;
b) forward received instruction to the third party;
c) receive an indication from the third party regarding a purchase of the item; and
d) forward the received indication to the subscriber.

18. The medium of claim 16, further comprising code for causing a processor to:
a) access information from at least one information source;
b) select at least a portion of the accessed information;
c) determine a format for the report; and
d) select at least one link for enabling the subscriber to perform the at least one transaction based on the selected at least one element of information within the report.

19. The medium of claim 16 further comprising code for causing a processor to generate a second report after the activation of the at least one activatable option.

20. The medium of claim 16 further comprising code for causing a processor to present the report again to the subscriber after facilitating the at least one transaction.

* * * * *